US012462823B2

(12) United States Patent
Mammone et al.

(10) Patent No.: US 12,462,823 B2
(45) **Date of Patent: *Nov. 4, 2025**

(54) ENCODED OUTPUT DATA STREAM TRANSMISSION

(71) Applicant: BlackBerry Limited, Waterloo (CA)

(72) Inventors: Joe Mammone, Kanata (CA); Michael Mead Truman, Mercer Island, WA (US)

(73) Assignee: BlackBerry Limited, Waterloo (CA)

( * ) Notice: Subject to any disclaimer, the term of this patent is extended or adjusted under 35 U.S.C. 154(b) by 70 days.

This patent is subject to a terminal disclaimer.

(21) Appl. No.: 18/506,010

(22) Filed: Nov. 9, 2023

(65) Prior Publication Data

US 2024/0071400 A1 Feb. 29, 2024

Related U.S. Application Data

(63) Continuation of application No. 17/816,447, filed on Aug. 1, 2022, now Pat. No. 11,830,512, which is a continuation of application No. 16/671,829, filed on Nov. 1, 2019, now Pat. No. 11,404,072, which is a continuation of application No. 15/818,384, filed on (Continued)

(51) Int. Cl.

| | |
|---|---|
| ***G10L 19/012*** | (2013.01) |
| ***G10L 19/26*** | (2013.01) |
| ***H04H 60/11*** | (2008.01) |
| *G10L 19/005* | (2013.01) |
| *G10L 19/008* | (2013.01) |
| *G10L 19/02* | (2013.01) |

(52) U.S. Cl.

CPC ............. *G10L 19/26* (2013.01); *H04H 60/11* (2013.01); *G10L 19/005* (2013.01); *G10L 19/008* (2013.01); *G10L 19/012* (2013.01); *G10L 19/0208* (2013.01)

(58) Field of Classification Search

CPC ... G10L 19/028; G10L 19/012; G10L 19/008; G10L 19/005; G10L 19/26

USPC ...................................................... 381/22–23

See application file for complete search history.

(56) References Cited

U.S. PATENT DOCUMENTS 6,038,529 A 3/2000 Harada
7,020,204 B2 * 3/2006 Auvray ................ H04N 19/152 375/E7.218

(Continued)

FOREIGN PATENT DOCUMENTS

WO 2012002768 1/2012

OTHER PUBLICATIONS

AVR Audio Guard, The History of AVR Audio Guard, website found at http:/www.marcsapps.co.uk/, Sep. 14, 2012 (1 page).

(Continued)

*Primary Examiner* — Disler Paul

(74) *Attorney, Agent, or Firm* — Conley Rose, P.C.; J. Robert Brown, Jr.

(57) ABSTRACT

In some examples, a first device receives a stream of application audio data, encodes the stream of application audio data, and in response to detecting an end of the stream of application audio data, provides pre-encoded filler audio data from a buffer in the first device as an encoded stream of filler audio data. The first device transmits the encoded stream of application audio data and the encoded stream of filler audio data in an encoded output data stream over a transport to a second device.

20 Claims, 9 Drawing Sheets

Related U.S. Application Data

Nov. 20, 2017, now Pat. No. 10,490,201, which is a continuation of application No. 14/717,815, filed on May 20, 2015, now Pat. No. 9,837,096, which is a continuation of application No. 13/450,083, filed on Apr. 18, 2012, now Pat. No. 9,065,576.

(56) References Cited

U.S. PATENT DOCUMENTS

| | | | | |
|---|---|---|---|---|
| 8,010,373 | B2 | 8/2011 | Myburg | |
| 8,041,051 | B2 | 10/2011 | Pilati | |
| 9,031,226 | B2 | 5/2015 | Chukka | |
| 9,514,757 | B2 * | 12/2016 | Oshikiri | G10L 19/22 |
| 2002/0177914 | A1 | 11/2002 | Chase | |
| 2006/0293885 | A1 | 12/2006 | Gournay | |
| 2008/0049785 | A1 | 2/2008 | Lakaniemi | |
| 2008/0226094 | A1 | 9/2008 | Rutschman | |
| 2010/0042416 | A1 | 2/2010 | Wan | |
| 2010/0260273 | A1 | 10/2010 | Raifel | |
| 2010/0280823 | A1 | 11/2010 | Shlomot | |
| 2010/0304679 | A1 | 12/2010 | Zeng | |
| 2011/0002378 | A1 | 1/2011 | Raveendran | |
| 2011/0002399 | A1 | 1/2011 | Raveendran | |
| 2011/0218797 | A1 * | 9/2011 | Mittal | G10L 19/18 704/200 |
| 2012/0051579 | A1 | 3/2012 | Cohen | |
| 2012/0158164 | A1 | 6/2012 | Grand | |
| 2013/0223633 | A1 | 8/2013 | Oshikiri | |
| 2014/0198029 | A1 | 7/2014 | Dang | |

OTHER PUBLICATIONS

AVR Audio Guard, The History of AVR Audio Guard So What's the Problem Exactly, website found at http:/www.marcsapps.co.uk/, Sep. 14, 2012 (1 page).

AVR Audio Guard, The History of AVR Audio Guard So What's the Problem Exactly How Does AVR Audio Guard help, website found at http:/www.marcsapps.co.uk/, Sep. 14, 2012 (1 page).

Marc's Apps, AVR Audio Guard, website found at http:/www.marcsapps.co.uk/, Sep. 14, 2012 (1 page).

* cited by examiner

ENCODED OUTPUT DATA STREAM TRANSMISSION

RELATED APPLICATION

This application is a continuation of U.S. application Ser. No. 17/816,447, filed Aug. 1, 2022, which is a continuation of U.S. application Ser. No. 16/671,829, filed Nov. 1, 2019, U.S. Pat. No. 11,404,072, which is a continuation of U.S. application Ser. No. 15/818,384, filed Nov. 20, 2017, U.S. Pat. No. 10,490,201, which is a continuation of U.S. application Ser. No. 14/717,815, filed May 20, 2015, U.S. Pat. No. 9,837,096, which is a continuation of U.S. application Ser. No. 13/450,083, filed on Apr. 18, 2012, U.S. Pat. No. 9,065,576, all of which are incorporated herein by reference in their entirety.

BACKGROUND OF THE INVENTION

1. Technical Field

The present disclosure relates to the field of formatting and transmitting audio data to a receiver. In particular, to a system, apparatus and method for transmitting continuous audio data.

2. Related Art

Electronic devices may be connected by a transport that enables one device to generate digital content and another device to render the digital content. For example, a DVD player can generate digital content and an audio/video (A/V) receiver can render the digital content when they are connected together. The DVD player sends audio data using the transport to the A/V receiver which renders the audio data to attached speakers. A Toshiba Link (Toslink™) connection is a common transport for audio data streams and High-Definition Multimedia Interface (HDMI) is a common transport for both audio and video data streams.

Since the receiver is expected to properly render the digital content it is designed to ensure that data discontinuities in the transport do not cause audible or visual artifacts. A data discontinuity may be caused by a small pause in the transport, a data error in the transport or even a change in audio sampling rate. A typical receiver will ensure that the data discontinuity does not cause audible artifacts by muting the audio for a short duration at least until the data is known to be correct. Muting the audio allows the receiver to reduce the latency and protect against audible artifacts even though some content may not be rendered. The receiver may consider the start of data in the transport as a data discontinuity that may result in muting of the audio. Muting during the start of data in the transport may prevent the listener from hearing the initial audio content.

BRIEF DESCRIPTION OF DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION

An electronic device, or sending device, can transmit continuous audio data that has been configured to mitigate data discontinuities in a receiving device where the sending device creates digital content and the receiving devices renders the digital content. The sending device mitigates data discontinuities by transmitting a continuous stream of audio data that has reduced changes to the audio data characteristics. The continuous stream of audio data is produced in the sending device by transmitting a stream of filler audio data when the digital content is not available. The receiving device may process the digital content and the stream of filler audio data as a continuous stream of audio data that mitigates data discontinuities caused by pauses in the digital content. The sending device may reduce changes to the audio data characteristics of the digital content using audio processing functionality. For example, a plurality of digital content may not all have the same audio sampling rate but all of the digital content may be processed with a sample rate convertor applied that causes the processed plurality of digital content to have the same audio sampling rate. Reduced changes to the audio data characteristics may mitigate data discontinuities in the receiving device.

The sending device transmitting continuous audio data may utilize more power resources to send the continuous audio data in the transport. Many devices are power constrained when operated, for example, using a battery. Devices that are power constrained may have low power modes that attempt to save power. There may be operating conditions on the sending device where transmitting continuous audio data can be stopped to save power and while still mitigating perceptible data discontinuities in the receiving device when continuous audio data is transmitted. The sending device can stop transmitting continuous audio data when the device is not being used in order to save power.

Figure 1:
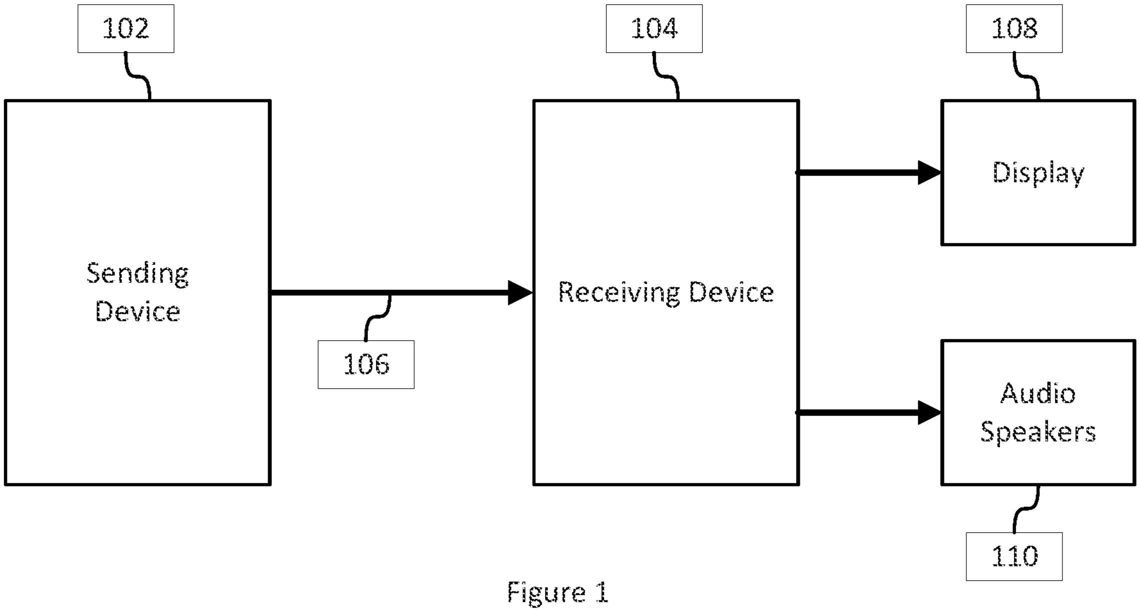
FIG. 1 is a schematic representation of an example sending device and an example receiving device where the receiving device renders audio content and video content.

FIG. 1 is a schematic representation of an example sending device 102 and an example receiving device 104 where the receiving device renders audio content and video content. The sending device 102 sends audio data, video data or both, to the receiving device 104 using a connection, or transport, 106. Sending device, or audio sending device, 102 may be any device capable of utilizing the transport 106, for example, a DVD player, set-top box, mobile phone, tablet computer or a desktop computer. Transport 106 may be any technology that is capable of sending an encoded output data stream containing audio data, video data or both, such as Toshiba Link (Toslink™), High-Definition Multimedia Interface (HDMI), Ethernet and WiFi™. Transport 106 is shown with the encoded output data stream flowing from the sending device 102 to the receiving device 104 but the encoded output data stream flow may be bidirectional. The receiving device, or audio receiving device, 104 may be any device capable of utilizing the transport 106 to receive audio data, video data or both, such as, for example, an A/V receiver and a digital television. The receiving device 104 renderers the audio content to audio speakers 110 and the video content to a display 108. Different configurations of transmitting device 102 and receiving device 104 are possible including configurations having more than one receiving device 104.

Figure 2:
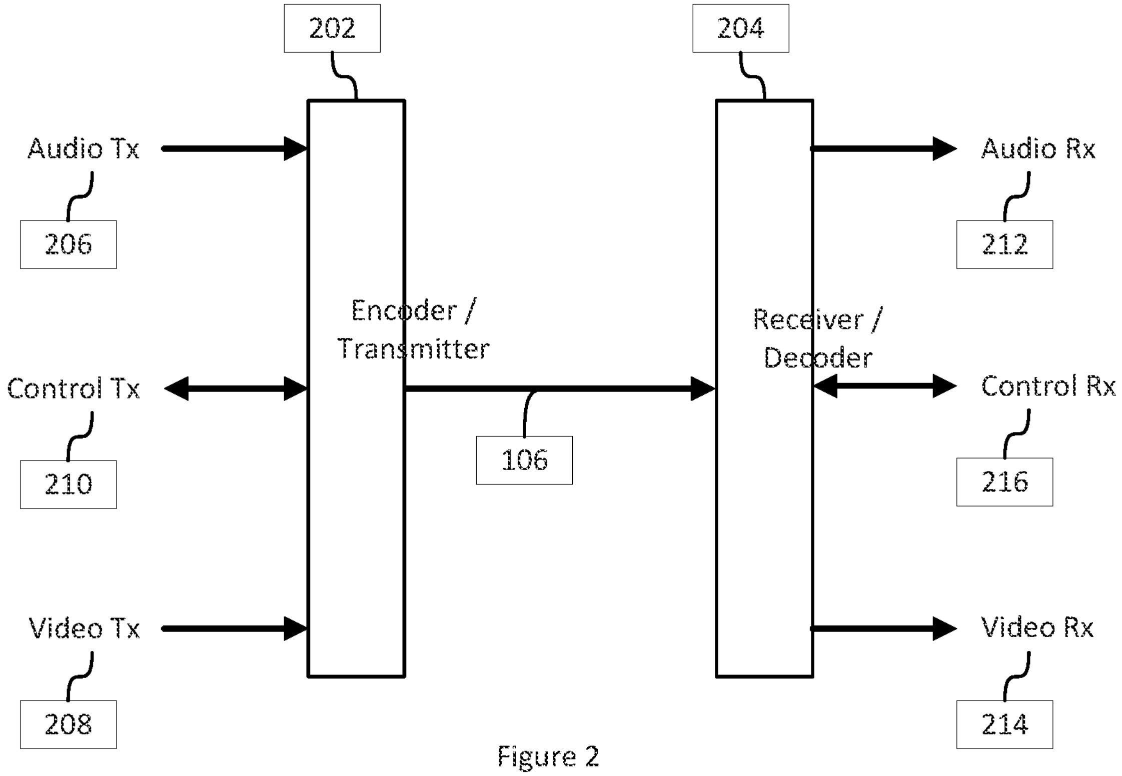
FIG. 2 is a schematic representation of an example system that has a plurality of data types encoded by a transmitter and decoded by a receiver.

FIG. 2 is a schematic representation of an example system that has a plurality of data types encoded by a transmitter 202 and decoded by a receiver 204. The transport 106 can send data including audio transmit data 206, video transmit data 208 and control transmit information 210 in the encoded output data stream. The audio transmit data 206, video transmit data 208 and the control transmit information 210 are encoded, or multiplexed, and transmitted by the encoder/transmitter 202 that may be contained within the sending device 102. The audio transmit data 206 and video transmit data 208 may be in a compressed or in an uncompressed format. Typical audio data utilize uncompressed formats such as Pulse Code Modulation (PCM) or compressed formats such as Dolby Digital™ and Digital Theatre System (DTS™). The audio receive data 212, video receive data 214 and the control receive information 216 is received and decoded, or demultiplexed, by the receiver/decoder 204 that may be contained within the receiving device 104. The transport 106 may be able to send encoded output data streams in both directions.

Figure 3:
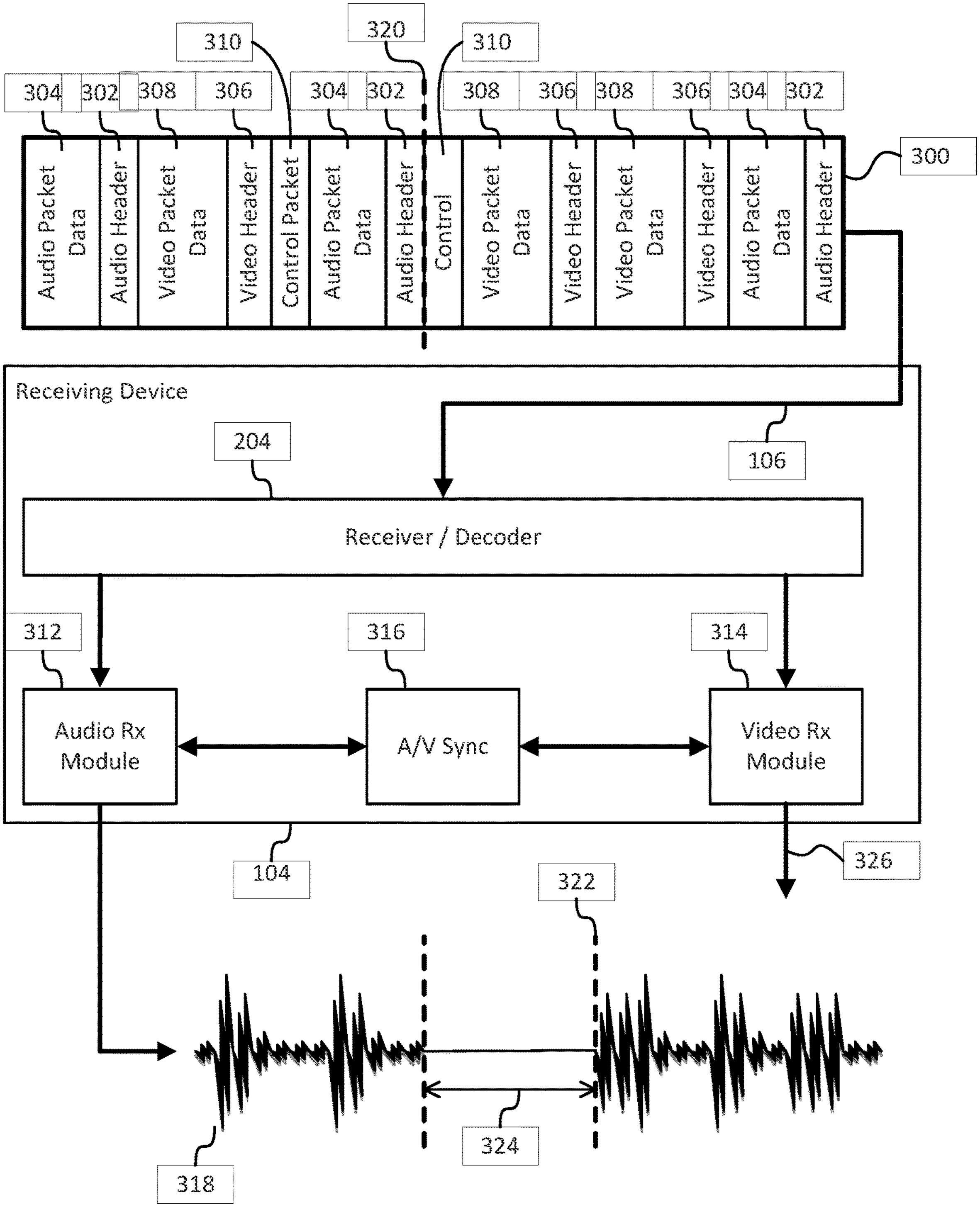
FIG. 3 is a schematic representation of an example receiving device processing a discontinuity in an encoded output data stream.

FIG. 3 is a schematic representation of an example receiving device 104 processing a discontinuity in an example encoded output data stream 300. The transport 106 sends the encoded output data stream 300 including audio headers 302, audio packet data 304, video headers 306, video packet data 308 and control packet data 310. The encoded output data stream 300 is shown with time progressing from right to left. Specific ordering of the encoded output data stream 300 in the transport 106 may depend on factors including data size and timing information. The audio header 302 may provide descriptive information about the audio packet data 304 as well as other well known relevant information such as timestamps. A timestamp may be used to synchronize the audio and video in the receiving device 104. The audio packet data 304 may contain compressed or the uncompressed audio data. The video header 306 may provide descriptive information about the video packet data 308 as well as other information such as timestamps. The video packet data 308 may contain compressed or the uncompressed video data. The control packet data 310 may contain information such as, for example, a number of audio and video data streams in the transport 106 and volume control information.

The receiver/decoder 204 processes the encoded output data stream 300 from the transport 106 and routes the processed encoded output data stream 300 to a corresponding processing module. For example, audio headers 302 and audio packet data 304 may be routed to an audio receiver module 312 and the video headers 306 and video packet data 308 may be routed to a video receiver module 314. The audio receiver module 312 and video receiver module 314 process the routed header and data information and respectively output a stream of audio output data 318 and a stream of video output data 326. The stream of audio output data 318 is shown with time progressing from right to left. The audio receiver module 312 and video receiver module 314 may have their respective outputs synchronized by an A/V synchronization mechanism 316 that may use timestamps to control the release of the stream of audio output data 318 and stream of video output data 326. The A/V synchronization mechanism 316 may ensure that the audio and video rendering are properly time aligned so that perceptual qualities including lip sync are met.

When a discontinuity 320 occurs in the encoded output data stream 300 it may correspond to a perceptible audio discontinuity 322 in the stream of audio output data 318. The discontinuity 320 may include, for example, a change in the audio sampling rate, no audio data or even a sending device 102 that skipped a single PCM sample. A skipped PCM sample may cause the A/V synchronization mechanism 316 to indicate that the encoded output data stream 300 is discontinuous to the audio receiver module 312. When the audio receiver module 312 receives a discontinuity it may mute the stream of audio output data 318 for a mute time 324. For example, if the audio sampling rate changes, a noticeable audible artifact such as a click may occur in the stream of audio output data 318 caused by a retiming in the A/V synchronization mechanism 316 or a resetting of a sample rate convertor. Muting the stream of audio output data 318 for a mute time 324 prevents noticeable audible artifacts with the result that some content may be missed (e.g. not be heard). The specified mute time 324 may be a fixed or variable duration and in some cases may be seconds in duration. The start of the encoded output data stream 300 in the transport 106 may be considered a discontinuity by the audio receiver module 312.

Mitigating the discontinuities 320 associated with audio transmit data 206 in the encoded output data stream 300 may reduce the occurrence of muting in the stream of audio output data 318. A sending device 102 may be configured to prevent many of the perceptible audio discontinuities 322 by producing continuous audio transmit data 206 that reduces changes to the audio characteristics in the encoded output data stream 300.

Figure 4:
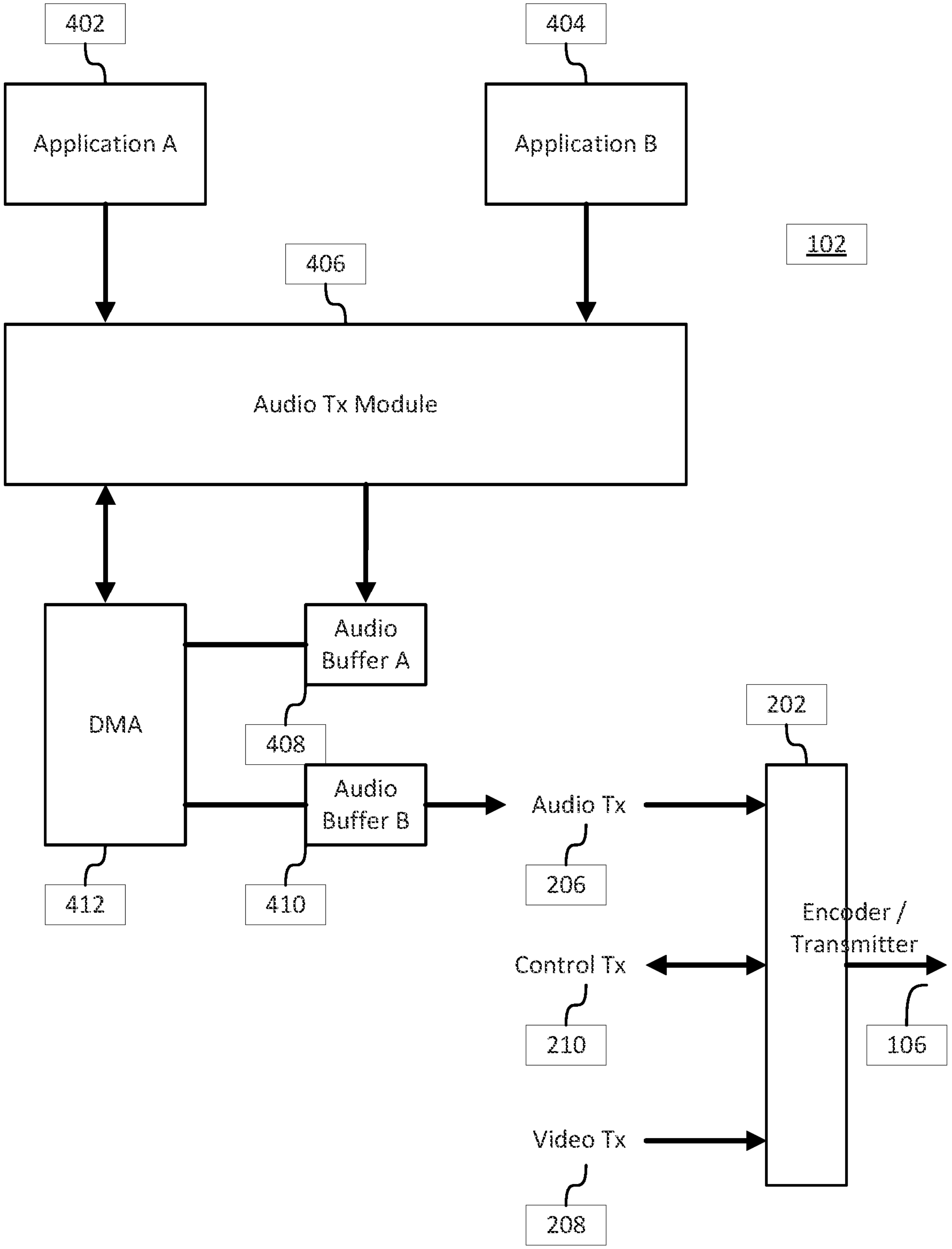
FIG. 4 is a schematic representation of an example sending device comprising a plurality of audio source applications and an audio transmitter module.

FIG. 4 is a schematic representation of an example sending device 102 comprising a plurality of audio source applications and an audio transmitter module 406. For example, application A 402 and application B 404 are components that each produces a stream of source audio data in the sending device 102. The audio transmitter module 406 processes the streams of source audio data from application A 402 and application B 404 and outputs a stream of application audio data. The audio transmitter module 406 may perform further audio processing and may also contain an audio driver (not illustrated). The audio driver may control sub-components that move the stream of application audio data from the output of the audio transmitter module 406 to the transport 106. The audio transmitter module 406 outputs the stream of application audio data that is buffered in an audio buffer A 408 and an audio buffer B 410. Typically two or more audio buffers are utilized in a double buffering configuration. The audio transmitter module 406 may, for example, control a direct memory access (DMA) engine 412 that moves the contents of audio buffer A 408 and audio buffer B 410 to the audio transmit data 206 of the encoder/transmitter 202. The DMA engine 412 may be used to copy the contents (e.g. the stream of application audio data) in audio buffer A 408 and audio buffer B 410 between the audio transmitter module 406 and the audio transmit data 206. Alternatively or in addition, a central processing unit (CPU) (not illustrated) may also perform the data copy. The audio driver may control the DMA engine 412 in the audio transmitter module 406.

Figure 5:
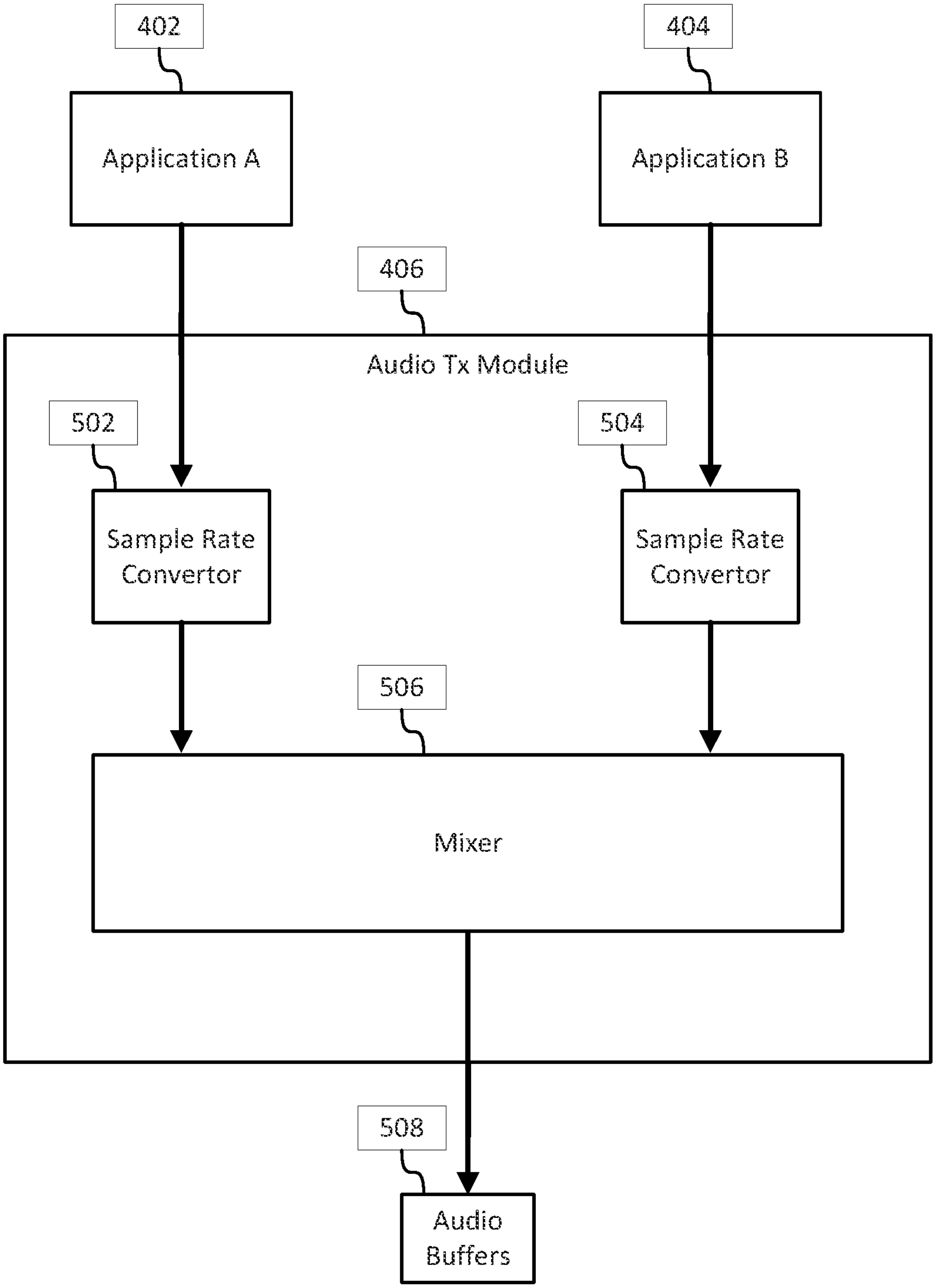
FIG. 5 is a schematic representation of an example audio transmitter module that can mitigate changes to the audio data characteristics and produce a continuous stream of application audio data.

FIG. 5 is a schematic representation of an example audio transmitter module 406 that can mitigate changes to the audio data characteristics and produce a continuous stream of application audio data. An audio transmitter module 406 may be capable of performing audio processing of the stream of source audio data such as sample rate conversion, equalization and mixing of multiple streams of source audio data together. The audio transmitter module 406 may mitigate changes to the audio data characteristics using audio processing components including sample rate convertors 502, 504 and a mixer 506. For example, the sample rate convertor 502 can ensure that the stream of source audio data from application A 402 is always at the same audio sampling rate in the audio buffers 508. In this example, application A 402 may output the stream of source audio data at different audio sampling rates because many music files have different audio sampling rates. An audio only file may have an audio sampling rate of 44.1 kHz whereas A/V files typically have an audio sampling rate of 48 kHz. The sample rate convertor 502 may be configured to process the stream of source audio data from application A 402 where the processed stream of application audio data is always at a constant audio sampling rate. For example, the audio transmitter module 406 can configure the output audio sampling rate of the sample rate convertor 502 to always be an audio sampling rate of 48 kHz. Setting the audio sampling rate to always be 48 kHz will mitigate changes to the audio data characteristics. Other changes to the audio data characteristics such as, for example, number of audio channels and audio resolution using further audio processing functions may be mitigated by the audio transmitter module 406. For example, the audio transmitter module 406 may process the stream of source audio data from application A where the processed stream of source audio data results in a two channel stream of application audio data with a resolution of 16-bits per sample regardless of the number of channels and resolution of the stream of source audio data.

An example application A 402 may not output a continuous stream of source audio data. For example, a music player may have small time gaps between audio files or a system sound effect may only produce audio for the duration of the system sound effect. When the stream of source audio data from application A 402 is not continuous it may cause perceptible audio discontinuities 322 in the receiving device 104. The perceptible audio discontinuities 322 may be mitigated when the audio transmitter module 406 produces a continuous stream of application audio data. The mixer 506 may be configured to output a stream of filler audio data when the audio transmitter module 406 does not receive any stream of source audio data. The mixer 506 may produce a stream of filler audio data that represents digital silence in the absence of any stream of source audio data. An audio transmitter module 406 may contain an alternate component in place of the mixer 506 that outputs digital silence in the absence of any stream of source audio data.

In an alternative embodiment, application B 404 may continuously produce filler audio data that represents digital silence that is processed by the mixer 506 to produce a continuous stream of source audio data. Application A 402 and application B 404 may output streams of source audio data at different audio sampling rates. When uncompressed audio data is mixed together the audio data needs to be at the same audio sampling rate. Sample rate convertor 502 can process the stream of source audio data from application A 402 and sample rate convertor 504 can process the stream of source audio data from application B 404. The sample rate convertors 502, 504 can produce streams of source audio data at the same audio sampling rate suitable for blending together in the mixer 506. Sample rate convertors 502, 504 and mixer 506 are optional components in the audio transmitter module 406. When application B 404 outputs a continuous stream of source audio data, the audio buffers 508 may contain a continuous stream of application audio data.

Figure 6:
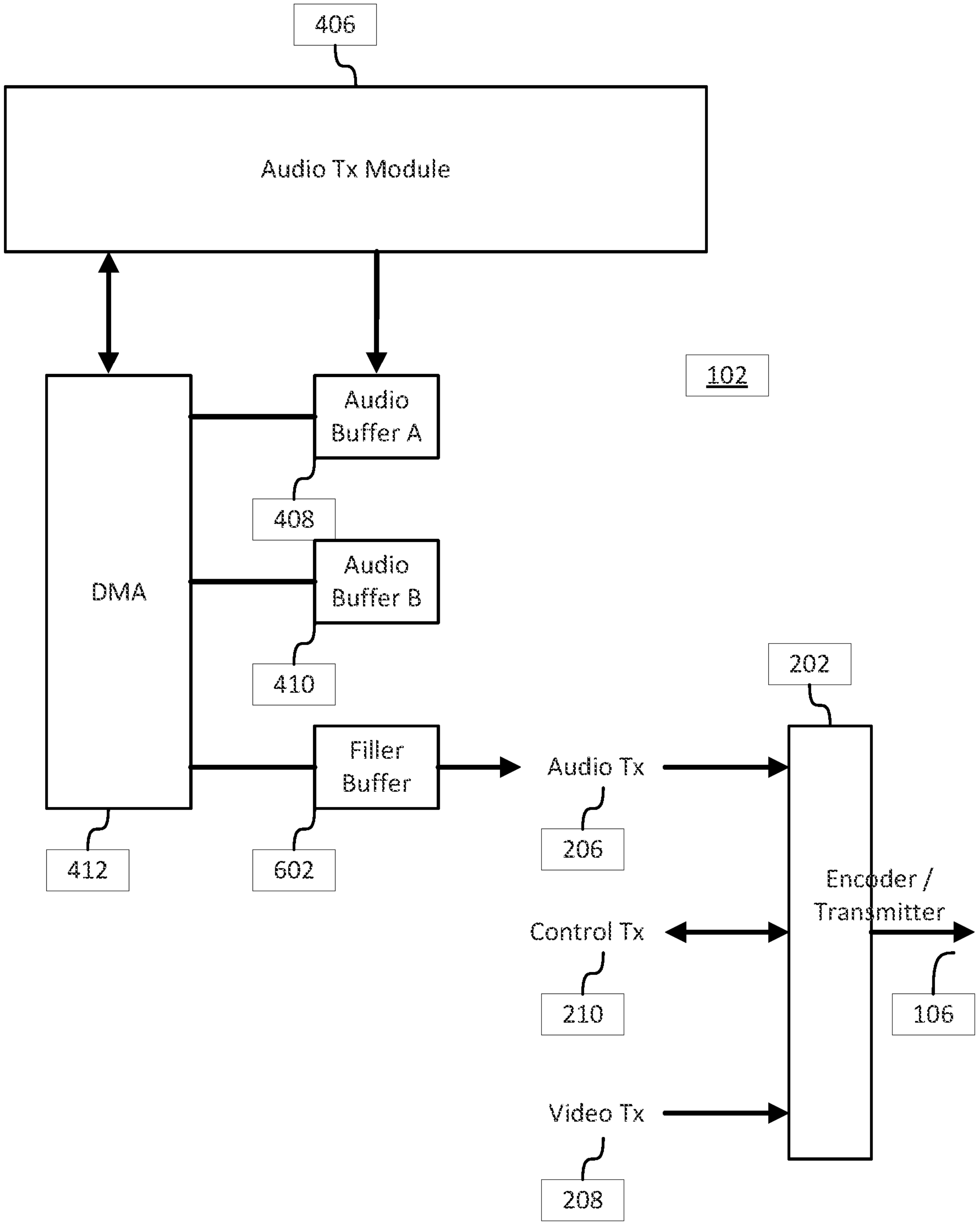
FIG. 6 is a schematic representation of an example sending device that can produce a stream of filler data using a Direct Memory Access (DMA) engine and a filler buffer.

FIG. 6 is a schematic representation of an example sending device 102 that can produce a stream of filler data using a Direct Memory Access (DMA) engine 412 and a filler buffer 602. The DMA engine 412 controls the audio buffering between the audio transmitter module 406 and the encoder/transmitter 202. When the audio transmitter module 406 produces a continuous stream of application audio data the encoder/transmitter 202 will produce a continuous encoded output data stream 300. When the audio transmitter module 406 does not produce a continuous stream of application audio data the DMA engine 412 may be configured by the audio transmitter module 406 to provide contents of a filler buffer 602 to the encoder/transmitter 202. The contents of filler buffer 602 may be immediately routed to the encoder/transmitter 202 when a discontinuity in the stream of application audio data occurs. The DMA engine 412 may be programmed by the audio transmitter module 406 to utilize the filler buffer 602 when a discontinuity occurs. The DMA engine 412 may copy the filler buffer 602 contents to the audio transmit data 206 immediately after the remaining content in audio buffer A 408 and audio buffer B 410 have been copied so that the audio transmit data 206 is continuous. The filler buffer 602 may be repeatedly copied to the audio transmit data 206 until a stream of application audio data is available. Alternatively, the DMA engine 412 functionality can be reproduced using a central processing unit (CPU) or using a similar function inside the encoder/transmitter 202. The filler buffer 602 that may be utilized to create the stream of filler data may represent audio content such as, for example, digital silence or comfort noise. The contents of the filler buffer 602 may be pre-encoded to match the audio data characteristics of the stream of application audio data.

The encoded output data stream 300 may contain compressed audio data that the receiving device 104 decodes and renders. Compressed audio data may include formats such as Dolby Digital™ and Digital Theatre System (DTS™). Discontinuities in the encoded output data stream 300 may cause perceptible audio discontinuities 322 when the audio packet data 304 contains compressed audio data. Perceptible audio discontinuities 322 can be mitigated when the encoded output data stream 300 contains a continuous compressed audio data stream with reduced changes to the compressed audio data characteristics. For example, the filler buffer 602 may contain a compressed data packet that when decoded in the receiving device 104 produces digital silence. The DMA engine 412 may immediately copy from the filler buffer 602, containing compressed audio data, to the audio transmit data 206 when the remaining content of audio buffer A 408 and audio buffer B 410 has been copied so that the audio transmit data 206 receives a stream of continuous compressed audio data. In an alternative embodiment, the audio transmitter module 406 or the encoder/transmitter 202 may send compressed audio data to produce a continuous encoded output data stream 300. Compressed audio data may be configured as a complete packet that represents a fixed number of audio samples. The complete packet of compressed audio data may be sent to mitigate perceptible audio discontinuities 322.

Figure 7:
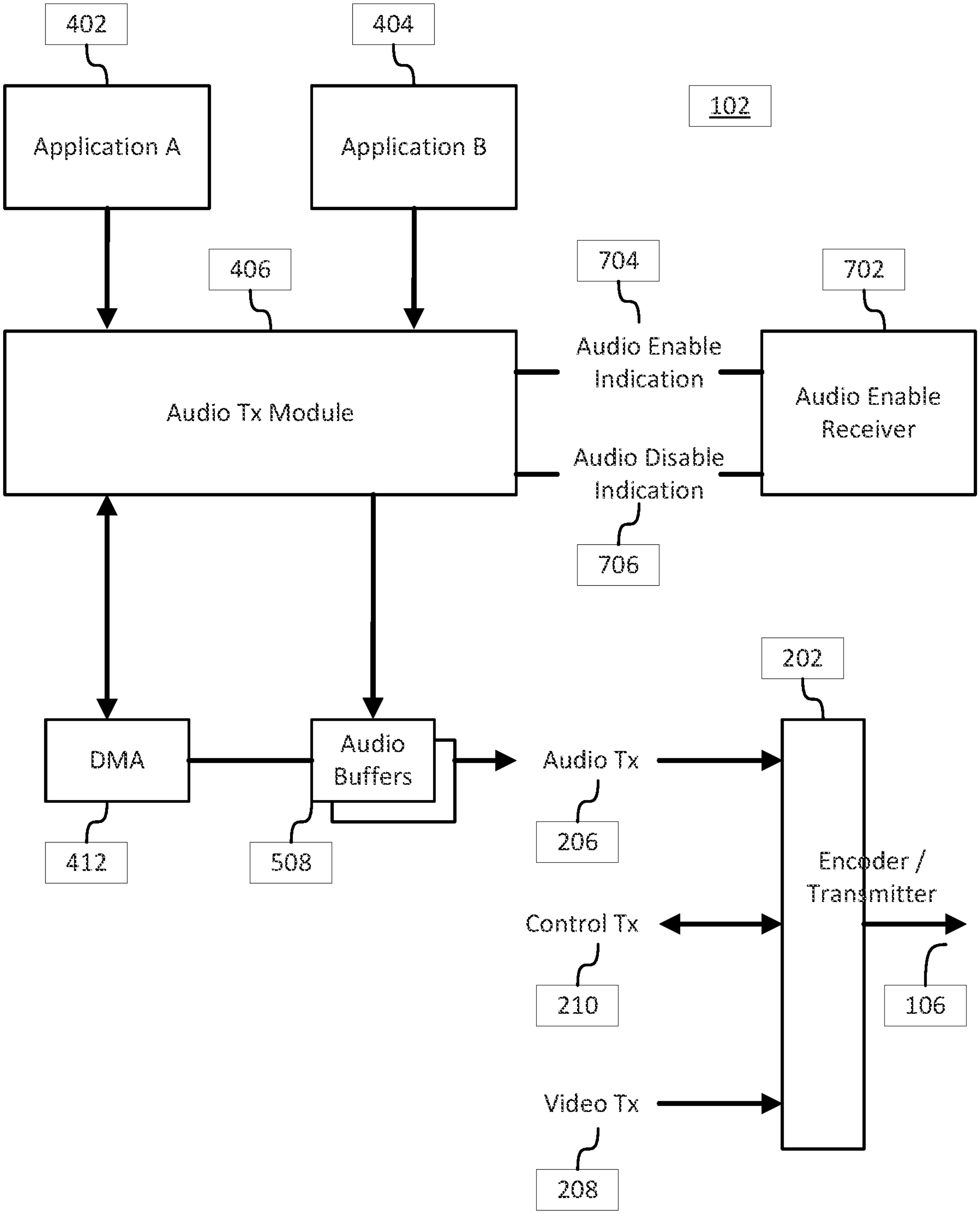
FIG. 7 is a schematic representation of an example sending device that utilizes an audio enable receiver to produce the encoded output data stream.

FIG. 7 is a schematic representation of an example sending device 102 that utilizes an audio enable receiver 702 to produce the encoded output data stream 300. Audio buffers 508 may consist of multiple audio buffers including, for example, audio buffer A 408, audio buffer B 410 and the filler buffer 602. A sending device 102 that produces the encoded output data stream 300 that mitigates perceptual audio discontinuities 322 may start sending the encoded output data stream 300 when the sending device 102 is powered on and stop sending the continuous encoded output data stream 300 when the sending device 102 is powered off. Logic that starts and stops the continuous encoded output data stream 300 when the sending device 102 is on or off may not be desirable when the sending device 102 is powered from a battery or where overall lower power consumption of the sending device 102 is desirable. Producing the continuous encoded output data stream 300 may drain the battery when the sending device 102 is, for example, powered on but not active. Logic in the audio transmitter module 406 may reduce power consumption by utilizing the audio enable receiver 702 to determine when to start and stop producing the continuous encoded output data stream 300. The audio enable receiver 702 may interpret relevant system information in the sending device 102 to determine when the continuous encoded output data stream 300 should be sent from the sending device 102. The audio transmitter module 406 may utilize an audio enable indication 704 from the audio enable receiver 702 to start the encoded output data stream 300 and an audio disable indication 706 from the audio enable receiver 702 to stop the encoded output data stream 300. Relevant system information may be, for example, sending device 102 power states, an audio mute enable, an indication of active applications and an indication of activity on the transport 106. For example, when the sending device 102 is muted the continuous encoded output data stream 300 may be stopped. In another example, when the sending device 102 has entered a low power state with no active applications the continuous encoded output data stream 300 may be stopped. When the sending device 102 wakes from a low power state the continuous encoded output data stream 300 may be started to ensure that no audio content is missed in the receiving device 104.

Stopping the audio transmitter module 406 from producing the continuous encoded output data stream 300 may not occur immediately in response to the audio enable indicator 704. The audio transmitter module 406 may, optionally, wait for a timeout threshold to be exceeded to ensure that all audio producing applications have completed before stopping the continuous encoded output data stream 300. For example, Application A 402 may be playing a list of audio tracks with a small gap between sequentially played audio tracks while the sending device 102 has entered a low power state. The small gap between sequentially played audio tracks may result in the audio transmitter module 406 stopping and starting the continuous encoded output data stream 300 when a timeout threshold is not used. A typical timeout threshold may be seconds in duration or could be any duration depending on the sending device 102.

In an alternative embodiment, the audio transmitter module 406 may have more than one audio data output (not illustrated). For example, the audio transmitter module 406 may have one audio data output routed to a loudspeaker that does not utilize a transport 106 and another audio data output routed to a receiving device 104 utilizing a transport 106. The system and method for transmitting continuous audio data may be applied to all audio data outputs of the audio transmitter module 406 or reduced to audio data that is sent to a receiving device 104 to prevent the noticeable audio mutes 324.

Figure 8:
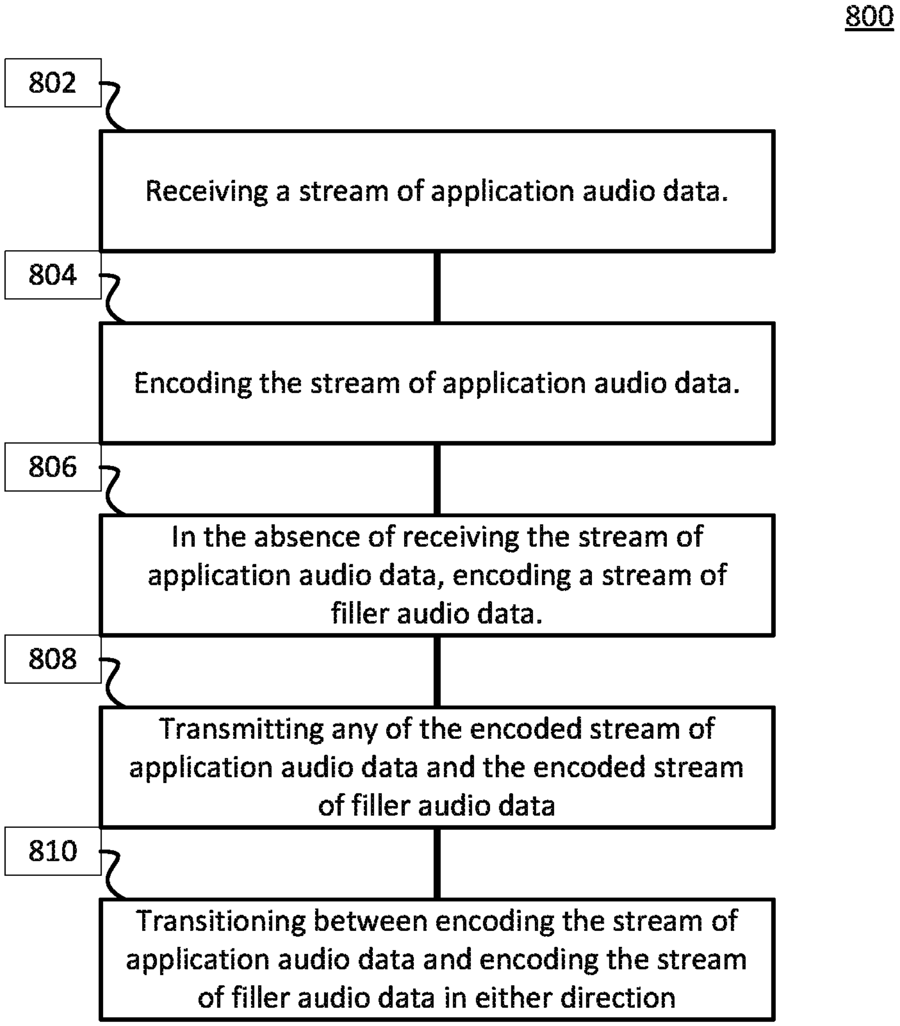
FIG. 8 is flow diagram representing the steps in a method for transmitting continuous audio data.

FIG. 8 is flow diagram representing the steps in a method for transmitting continuous audio data 800. In step 802, a stream of application audio data from any of a plurality of audio source applications on the audio sending device 102 may be received. The audio source applications may be, for example, a music player, a video player, a game or sound effects associated with a user interface. In step 804, the stream of application audio data is encoded. The encoding may be configured to mitigate discontinuities in the encoding perceived by the audio receiving device 104. The encoding may be configured to mitigate discontinuities by processing the stream of application audio data so that the changes to the audio data characteristics are reduced. For example, processing the stream of application audio to have the same audio sampling rate will mitigate discontinuities. In 806, in the absence of receiving the stream of application audio data, a stream of filler audio data is encoded. The encoding may be configured to mitigate discontinuities in the encoding perceived by the audio receiving device 104. A stream of filler audio data may be encoded when no application audio data is received that has similar characteristics to the encoded stream of application audio data. For example, the encoded stream of filler data can be configured to have the same audio sampling rate as the encoded stream of application audio data. In step 808, any of the encoded stream of application audio data and the encoded stream of filler audio data may be transmitted via an encoded output data stream 300 to the audio receiving device 104 for decoding. The encoded output data stream 300 is send in the transport where the transport may, for example, include Toshiba Link (Toslink™), High-Definition Multimedia Interface (HDMI), Ethernet and WiFi™. In step 810, transitions between encoding the stream of application audio data of step 804 and encoding the stream of filler audio data of step 806, where transitioning may occur in either direction responsive to respectively receiving, and to ceasing to receive, the stream of application audio data. For example, encoding of the filler audio data may begin when a previously received stream of application audio data ends and may stop when a subsequent stream of application audio data is received. Also, encoding of the filler audio data may begin before the stream of application audio data is first received and may stop on receipt. Transitioning from encoding the stream of application audio data to encoding the stream of filler audio data produces a continuous encoded output data stream 300 that mitigates discontinuities in the encoding perceived by the audio receiving device 104. The audio receiving device 104 may not interpret any difference between the stream of encoded application audio data and the stream of encoded filler audio data.

Figure 9:
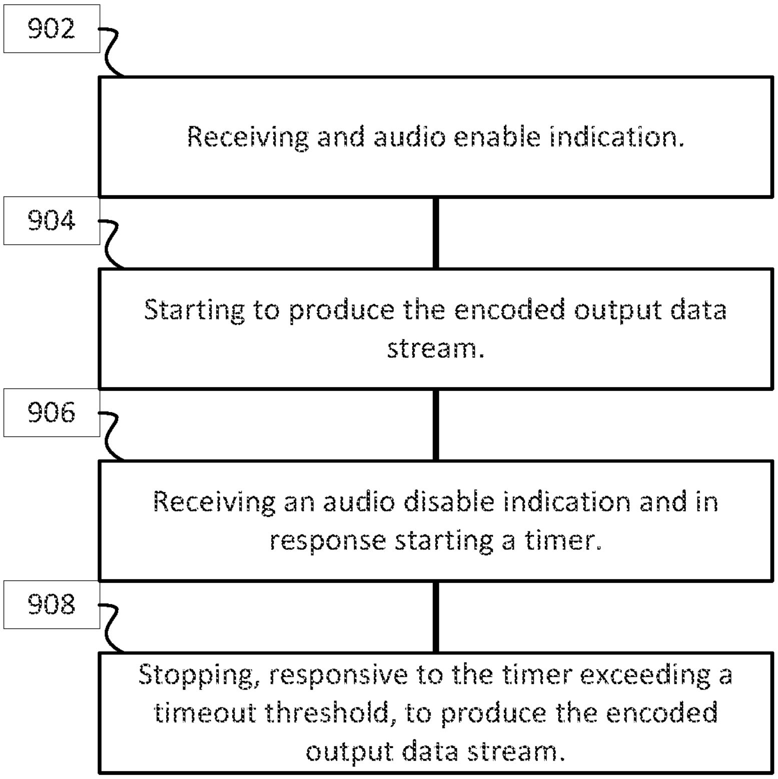
FIG. 9 is flow diagram representing the further steps in a method for transmitting continuous audio data responsive to an audio enable receiver.

FIG. 9 is flow diagram representing the further steps in a method for transmitting continuous audio data responsive to an audio enable receiver 702. In step 902 an audio enable indication 704 may be received. The audio enable indication

704 can indicate that a stream of application audio data may be starting. For example, the sending device 102 coming out of a low power state may start producing a stream of application data whereas the sending device 102 may not have been producing a stream of application data during the low power state. In step 904 responsive to receiving the audio enable indication 704, the encoded output data stream 300 may start to be produced. The encoded audio data stream 300 may contain the stream of encoded application audio data or the stream of encoded filler audio data. The stream of filler audio data may be first to be encoded after the audio enable indication 704 has been received when none of a plurality of audio source application has started a stream of application audio data before the audio enable indication 704. Sending the encoded stream of filler audio data before the encoded stream of application audio data may mitigate discontinuities in the encoding perceived by the audio receiving device 104. The start of an encoded output data stream 300 may cause a perceivable discontinuity in the audio receiving device that the stream of filler audio data may mitigate. In step 906 an audio disable indication 706 may be received and in response starting a timer. The audio disable indication 706 may, for example, indicate that the stream of application audio data has stopped and more streams of application audio data may not be expected until the next audio enable indication 704. The timer is used to delay the stopping of the encoded output data stream. In step 908 responsive to the timer exceeding a timeout threshold, the encoded output data stream 300 may stop being produced. Once the timeout threshold has been exceeded the production of the encoded output data stream 300 is stopped. The sending device 102 may receive an audio enable indication 704, of step 902, before the timer exceeds the timeout threshold that may cancel the timer and the sending device 102 may continue to produce the encoded output data stream 300.

Figure 10:
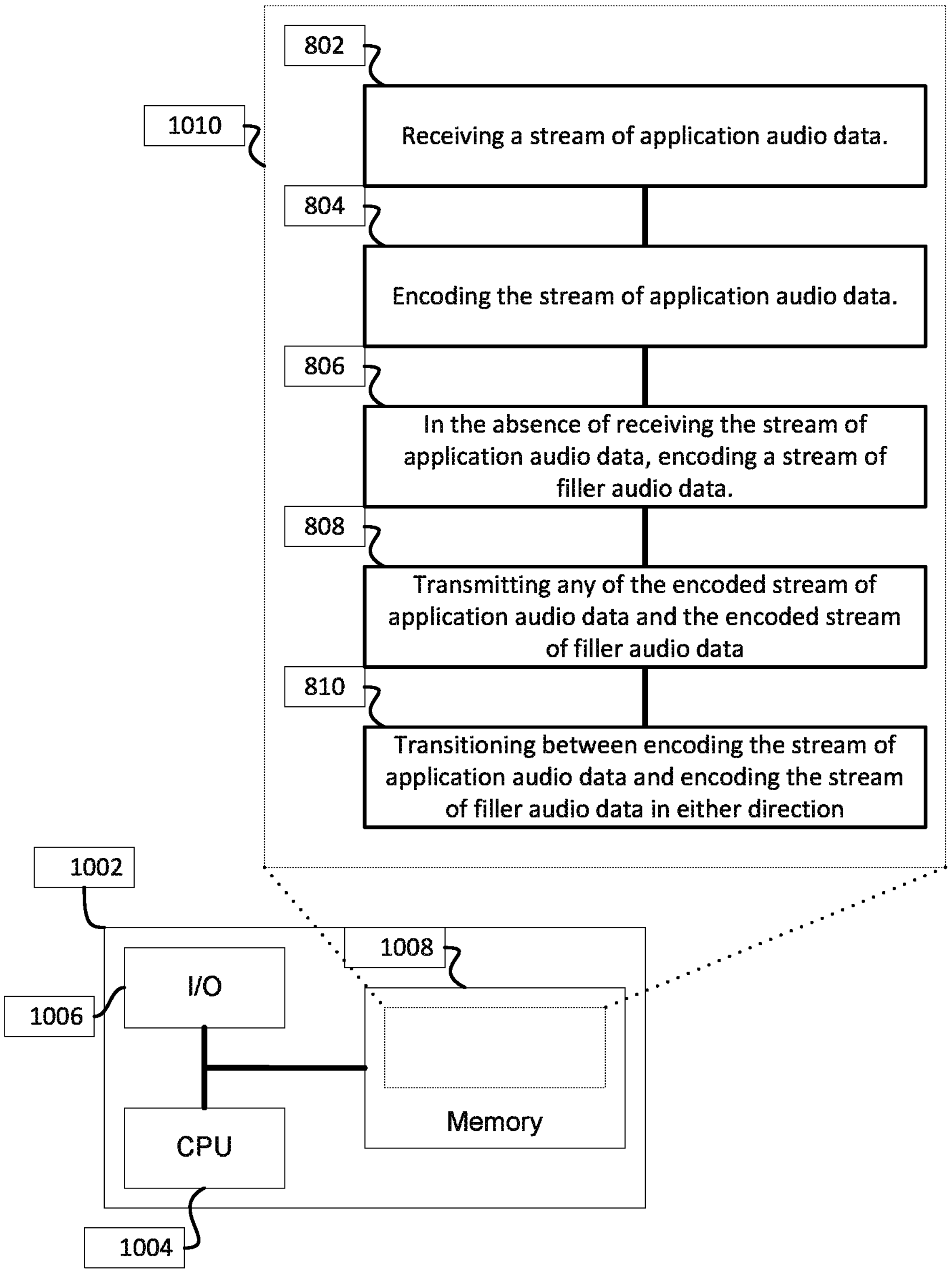
FIG. 10 is a schematic representation of an example audio transmitter system that produces continuous audio data.

FIG. 10 is a schematic representation of an example system for transmitting continuous audio data 1002 that produces continuous audio data. The system 1002 comprises a processor 1004 (aka CPU), input and output interfaces 1006 (aka I/O) and memory 1008. The memory 1008 may store instructions 1010 that, when executed by the processor, configure the system to enact the system and method for transmitting continuous audio data described herein with reference to any of the preceding FIGS. 1-9. The instructions 1010 may include the following. Receiving a stream of application audio data 802. Encoding the stream of application audio data 804. In the absence of receiving the stream of application audio data, encoding a stream of filler audio data 806. Transmitting any of the encoded stream of application audio data and the encoded stream of filler audio data 808. Transitioning between the encoding the stream of application audio data and encoding the stream of filler audio data in either direction 810.

The method according to the present invention can be implemented by computer executable program instructions stored on a computer-readable storage medium.

While various embodiments of the invention have been described, it will be apparent to those of ordinary skill in the art that many more embodiments and implementations are possible within the scope of the present invention. Accordingly, the invention is not to be restricted except in light of the attached claims and their equivalents.

What is claimed is:

1. A method for transmitting encoded audio data from a first device to a second device, the method comprising:

receiving, by a transmitter, a stream of application audio data from any of a plurality of audio source applications on the first device;

encoding, by the transmitter, the stream of application audio data;

in response to an end of the stream of application audio data, providing, by the transmitter, encoded filler audio data as an encoded stream of filler audio data; and transmitting, by the transmitter, the encoded stream of application audio data and the encoded stream of filler audio data in an encoded output data stream to the second device for decoding, wherein the encoded stream of application audio data and the encoded stream of filler audio data comprise constant audio data characteristics in the encoded output data stream, and wherein the constant audio data characteristics comprise any one or more of a constant sample rate, a constant number of channels, or a constant resolution in the encoded output data stream.

2. The method of claim 1, wherein the providing of the encoded filler audio data as the encoded stream of filler audio data stops responsive to receiving a further stream of application audio data, the method further comprising:

encoding, by the transmitter, the further stream of application audio data; and transmitting, by the transmitter, the encoded further stream of application audio data in the encoded output data stream to the second device for decoding.

3. The method of claim 1, wherein the encoded stream of filler audio data uses the same audio data characteristics as the encoded stream of application audio data in the encoded output data stream.

4. The method of claim 1, wherein the encoded filler audio data represents digital silence or noise.

5. The method of claim 1, further comprising:

receiving an audio enable indication; and starting, responsive to receiving the audio enable indication, to produce the encoded output data stream.

6. The method of claim 5, wherein the audio enable indication is responsive to any of a component power state, a mute indication state, availability of a stream of application audio data, or activity of a network between the first device and the second device.

7. The method of claim 1, wherein the encoded output data stream comprises one of uncompressed audio data or compressed audio data.

8. A first device comprising:

a processor;

a memory to store a plurality of audio source applications executable on the processor; and a buffer to store pre-encoded filler audio data;

a transmitter configured to:

receive a stream of application audio data from any of the plurality of audio source applications;

encode the stream of application audio data;

in response to the stream of application audio data ending, copy the pre-encoded filler audio data from the buffer to provide an encoded stream of filler audio data; and transmit the encoded stream of application audio data and the encoded stream of filler audio data in an encoded output data stream to a second device.

9. The first device of claim 8, wherein the encoded stream of application audio data and the encoded stream of filler audio data comprise a constant audio data characteristic in the encoded output data stream.

10. The first device of claim 9, wherein the constant audio data characteristic comprises any one or more of a constant sample rate, a constant number of channels, or a constant resolution in the encoded output data stream.

11. The first device of claim 9, wherein the encoded stream of filler audio data comprises the same audio data characteristic as the encoded stream of application audio data in the encoded output data stream.

12. The first device of claim 8, further comprising machine-readable instructions executable on the processor to:

receive an audio enable indication; and cause starting, responsive to receiving the audio enable indication, of a production of the encoded output data stream.

13. The first device of claim 8, wherein the pre-encoded filler audio data represents digital silence or noise.

14. A non-transitory storage medium storing instructions that upon execution cause an first device to:

receive a stream of application audio data from any of a plurality of audio source applications;

encode the stream of application audio data;

in response to an end of the stream of application audio data, provide encoded filler audio data in the first device as an encoded stream of filler audio data; and cause transmission of the encoded stream of application audio data and the encoded stream of filler audio data in an encoded output data stream to a second device, wherein the encoded stream of application audio data and the encoded stream of filler audio data comprise a constant audio data characteristic in the encoded output data stream, and wherein the constant audio data characteristic comprises any one or more of a constant sample rate, a constant number of channels, or a constant resolution.

15. The non-transitory storage medium of claim 14, wherein the encoded filler audio data is pre-encoded filler audio data from a buffer in the first device.

16. The non-transitory storage medium of claim 14, wherein the instructions upon execution cause the first device to:

receive an audio enable indication; and cause starting, responsive to receiving the audio enable indication, of a production of the encoded output data stream.

17. The non-transitory storage medium of claim 14, wherein the instructions upon execution cause the first device to:

receive an audio disable indication, and in response to the audio disable indication start a timer; and cause stopping, responsive to the timer exceeding a timeout threshold, of a production of the encoded output data stream.

18. A first device comprising:

a processor;

a memory to store a plurality of audio source applications executable on the processor; and a transmitter configured to:

receive a stream of application audio data from any of the plurality of audio source applications;

encode the stream of application audio data;

in response to an end of the stream of application audio data, provide encoded filler audio data in the first device as an encoded stream of filler audio data; and transmit the encoded stream of application audio data and the encoded stream of filler audio data in an encoded output data stream to a second device, wherein the encoded stream of application audio data and the encoded stream of filler audio data comprise a constant audio data characteristic in the encoded output data stream, and wherein the constant audio data characteristic comprises any one or more of a constant sample rate, a constant number of channels, or a constant resolution.

19. The first device of claim 18, further comprising machine-readable instructions executable on the processor to:

receive an audio enable indication; and cause starting, responsive to receiving the audio enable indication, of a production of the encoded output data stream.

20. The first device of claim 18, further comprising machine-readable instructions executable on the processor to:

receive an audio disable indication, and in response to the audio disable indication start a timer; and cause stopping, responsive to the timer exceeding a timeout threshold, of a production of the encoded output data stream.

* * * * *